UNITED STATES PATENT OFFICE.

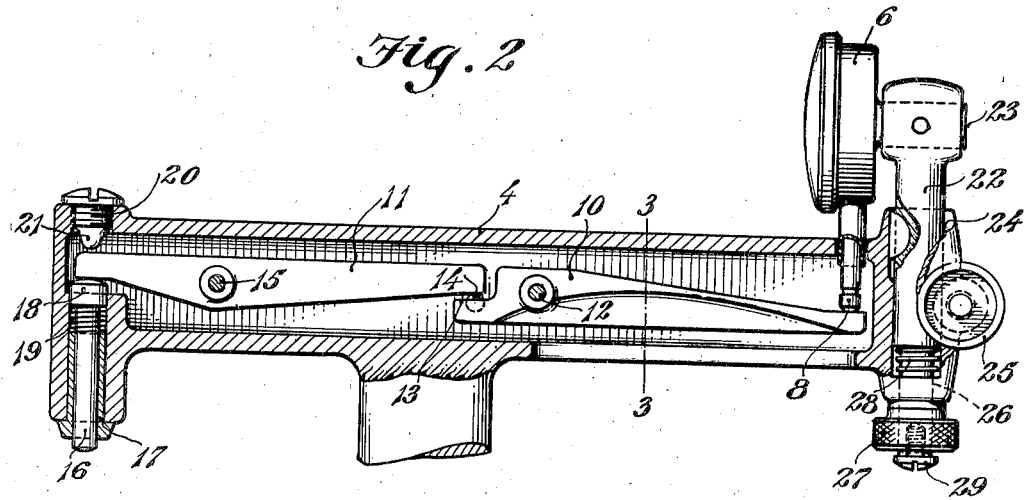
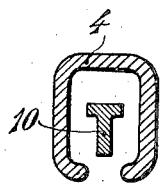
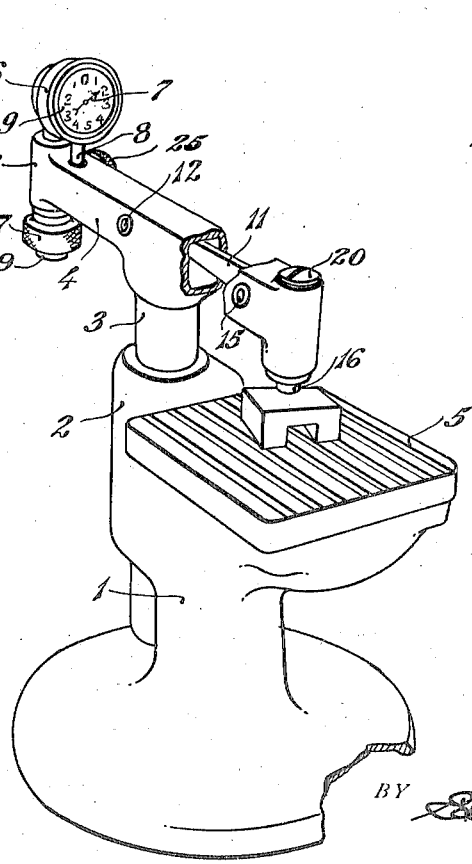

FRANK L. WALTER, OF DAYTON, OHIO.

AMPLIFYING-GAGE.

1,290,434.     Specification of Letters Patent.     Patented Jan. 7, 1919.

Application filed August 23, 1917. Serial No. 187,753.

*To all whom it may concern:*

Be it known that I, FRANK L. WALTER, a citizen of the United States, residing at Dayton, in the county of Montgomery and State of Ohio, have invented certain new and useful Improvements in Amplifying-Gages, of which the following is a specification, reference being had therein to the accompanying drawing.

This invention relates to amplifying gages. In shops producing work which is required to be very accurate each piece of work is tested by the workman, or the inspector, or both, on a gage of some sort to see that it conforms to the required dimensions. Where extreme accuracy is desired, as is the case in a great many classes of work, the graduations of the gage are so fine that it is difficult to read them quickly and accurately, and it has been proposed heretofore to provide a gage which would amplify the indication to facilitate the reading of the same. These devices, while in more or less common use, have not been entirely satisfactory.

The object of the present invention is to provide an improved gage of this kind which will be very sensitive; and which will have its work engaging member so arranged that it can be caused to engage work, or parts, of various shapes.

It is also an object of the invention to provide a gage of this kind which can be easily and quickly adjusted with extreme accuracy.

It is also an object of the invention to provide a device of this kind which will be simple in construction, positive and accurate in its operation, and which can be produced at a relatively low cost.

In the accompanying drawings Figure 1 is a perspective view of an amplifying gage embodying my invention; Fig. 2 is an elevation, partly in section, of the amplifying devices and indicator; and Fig. 3 is a section taken on the line 3—3 of Fig. 2.

In these drawings I have illustrated one embodiment of my invention and have shown the same as mounted on a base 1 having a vertical bearing, or guide-way, 2, in which is mounted a shank 3 carrying a supporting frame 4 on which the work engaging and amplifying devices are mounted. The base 1 also has mounted thereon a work supporting table 5 which extends beneath a portion of the supporting frame 4. Mounted on the supporting frame 4 above the table is a work engaging member which is connected by suitable amplifying devices with an indicator, or gage, also mounted on the frame 4, the connection between the work engaging member and the gage being such that the movement imparted to the work engaging member by the work will cause a greatly increased movement of the indicating member, or needle, of the indicator. So much of the mechanism has been heretofore used in connection with amplifying gages but, as has been above stated, these gages have not been wholly satisfactory in their operation.

In that embodiment of my invention here illustrated I have shown the indicator 6 as comprising a needle 7 operatively connected with a slide-rod, or plunger, 8, the movement of which will cause the needle to travel over a dial 9. This dial is calibrated to read above and below a neutral, or zero, point, upon which point the needle will rest when the work is absolutely true to size. If the work is slightly under size the needle will indicate a point on one side of zero and if the work is over size the needle will indicate a point on the opposite side of zero, the position of the needle in each instance indicating the amount of deviation of the work from the true size. Preferably, for convenience in reading, the zero point is at the top of the indicator. This indicator forms no part of the present invention as it is of a commercial type, and it need not be described in detail. The amplifying devices for transmitting the movement from the work engaging member to the indicator comprise, in the form here shown, two levers 10 and 11. These levers are pivotally mounted on the supporting frame 4 which in the present instance is in the form of a hollow bar slotted along its lower edge, and the levers are mounted within the bar and are pivotally supported on the side walls thereof. The lever 10 is arranged with one end beneath and in operative engagement with the plunger 8 of the indicator 6. Preferably this lever is pivotally mounted on the frame, as shown at 12, with its axis near that end thereof remote from the indicator so that any movement imparted to the remote end of the lever will be greatly increased at the opposite end of the lever, which actuates the indicator. The second lever, 11, is, in the present construction, arranged in alinement with the lever 10 and has that end adjacent to the lever 10 operatively connected with the short end of the lever 10. As here shown the lever 10 has a depressed portion forming a shoulder 13 to engage the lever 11, and the contact point is preferably formed by a hardened ball 14 which is mounted in the depressed portion 12 and forms a part thereof. The opposite end of the lever 11 is arranged to be actuated by the work engaging member and this lever is also pivotally mounted in the frame 4, as shown at 15, and has its axis arranged somewhat closer to the work engaging end thereof than to that end which is connected with the lever 10, so that the movement imparted to the one end of the lever will in this case also be multiplied at the opposite end of the lever. Consequently the movement imparted to the short end of the lever 11 by the work engaging device will be multiplied by both levers before it is transmitted to the indicator. The positions of the axes of the two levers, and the shape and weight of the ends thereof, are so arranged as to partially or wholly balance these levers, so that very little load is imposed upon the work engaging device and the levers will respond very quickly and accurately to any movement which is imparted to the work engaging device.

The work engaging device is here shown as a pin 16 slidably mounted in a bushing 17 secured in a transverse bore formed in the end of the frame 4. The pin has a hardened head 18 to engage the end of the lever 11, and a spring 19 confined between the end of the head and the bushing 17 serves to hold the head 18 in engagement with the end of the lever but the strength of the spring is not sufficient to impart any movement to the lever. The bore in the end of the frame 4 extends through the upper wall thereof and is closed by a screw-threaded plug 20 which has a part 21 projecting into the hollow frame member above the end of the lever 11 and forming an adjustable stop to limit the movement of the lever and thus prevent any injury to the indicator or other parts of the mechanism should violent movement be imparted to the work engaging pin. In order that the gage may be used with work of different sizes it is necessary that some means be provided for adjusting the same to cause the indicator to indicate zero when different articles, of correct size, are placed in engagement with the work engaging member. I preferably accomplish this by adjusting the indicator 6 bodily so as to change the position of the same with relation to the end of the lever 10. As here shown the indicator is rigidly secured to the upper end of a slidable rod, or shank, 22, which has an apertured upper end to receive a stud 23 secured to the indicating device. In assembling the device the indicator is accurately positioned with relation to the shank 22 and is then pinned or otherwise secured firmly in position. The shank 22 is mounted in a split sleeve, or guide-way, 24, formed at the adjacent end of the frame 4 and this guide-way is provided with a clamping screw 25 by means of which it may be tightened about the shank 22 to hold the latter securely in its adjusted position, or may be released to permit the adjustment of the shank. The lower end portion of the shank is reduced, as shown at 26, and extends through an opening in the lower end of the guide-way 24, this reduced portion of the shank being threaded to receive a nut 27 which bears against the lower end of the guide-way 24 and serves to adjust the shank therein. A spring 28 is arranged within the guide-way and acts upon the shank to hold the nut in engagement with the lower end of the guide-way, thus when the clamping screw 25 has been actuated to release the shank the movement of the nut 27 in one direction will draw the shank downward and the movement of the nut in the opposite direction will permit the shank to be moved upward by the spring. When the adjustment has been secured the clamping screw is tightened down to securely lock the shank against further movement and after the adjustment has been secured the spring 28 has no function. A screw 29 inserted in the reduced portion 26 of the shank prevents the nut 27 from being entirely withdrawn from the shank.

To adjust the device to a particular piece of work an article true to size, or preferably a master gage block, is placed upon the work table 5 and the supporting frame 4 is adjusted relatively to the base 1 to position the work engaging device 16 in approximately its correct position. After this adjustment has been accomplished the work, or gage block, is placed in engagement with the work engaging device and the clamping nut 25 is manipulated to release the indicator shank and this indicator is then adjusted to cause the needle 7 to indicate zero. With the needle in zero position the clamping screw 25 is tightened down and the indicator locked in its adjusted position. As the work is then placed, piece by piece, in engagement with the work engaging device, the needle will be actuated as above described to indicate the extent of deviation of each article from the true size. Because of the arrangement of the work engaging device at the extreme end of the amplifying lever, instead of between the axis of the same and the indicator, it is possible to place this device close to the end of the supporting frame, and work of various shapes can be readily brought into engagement with the work engaging device, as for example, work having a shoulder or projection extending above the part, the size of which is to be measured, which shoulder would prevent the work being placed any considerable distance beneath the frame 4. Because of the balanced double levers the device is very sensitive and any movement of the work engaging device will be accurately transmitted, in an amplifying form, to the indicator, where it can be quickly and easily read. The adjustment of the indicator is very easily accomplished and it is very easy to maintain the device in accurate adjustment. By occasionally applying the master gage block to the work engaging device the accuracy of the indication can be tested and if there has been any slight variation this may be very quickly corrected. Moreover, the arrangement of the adjusting device is such that a relatively large movement of the adjusting nut is required to adjust the indicator to a small variation in the size of the work, thus enabling fine adjustments to be easily made. Further, the device is simple in its construction and the parts are such that they can be easily manufactured and assembled, and because of the adjustments which are possible extremely close workmanship is not required in the production of the several parts.

While I have shown and described one embodiment of my invention I wish it to be understood that I do not desire to be limited to the details of construction as various modifications will occur to a person skilled in the art.

Having now fully described my invention, what I claim as new and desire to secure by Letters Patent, is:—

1. In an amplifying gage, a work supporting table, a frame having one end arranged above said table, a work engaging device mounted on said end of said frame for movement toward and from said table, a lever pivotally mounted between its ends on said frame and having its outer end arranged to be actuated by said work engaging device, a second lever pivotally mounted between its ends on said frame and having its inner end operatively connected with the inner end of said first-mentioned lever, an indicating device mounted on said frame, and an operative connection between the outer end of said last-mentioned lever and said indicating device.

2. In an amplifying gage, a work supporting table, a supporting frame having one end mounted above said table, a work engaging pin slidably mounted on said end of said frame, a lever pivotally mounted between its ends on said frame and having one end arranged to be actuated by said pin, a second lever pivotally mounted between its ends on said frame and having its inner end arranged beneath and in operative engagement with the inner end of the first-mentioned lever, and an indicating device mounted on said frame and arranged to be actuated by the outer end of the last-mentioned lever.

3. In an amplifying gage, a work supporting table, a frame having one end arranged above said table, said parts being adjustable relatively one to the other, a work engaging device mounted on said end of said frame for movement toward and from said table, a lever pivotally mounted between its ends on said frame and having its outer end arranged to be actuated by said work engaging device, a second lever pivotally mounted between its ends on said frame and having its inner end operatively connected with the inner end of said first-mentioned lever, an indicating device mounted on said frame, and an operative connection between the outer end of said last-mentioned lever and said indicating device.

4. In an amplifying gage, a work supporting table, a supporting frame having one end mounted above said table, said parts being adjustable relatively one to the other, a work engaging pin slidably mounted on said end of said frame, a lever pivotally mounted between its ends on said frame and having one end arranged to be actuated by said pin, a second lever pivotally mounted between its ends on said frame and having its inner end arranged beneath and in operative engagement with the inner end of said first-mentioned lever, and an indicating device mounted on said frame and arranged to be actuated by the outer end of the last-mentioned lever.

5. In an amplifying gage, an indicating device, a work engaging device, a pair of amplifying levers to connect said work engaging device with said indicating device, said levers being operatively connected one with the other and being so arranged and proportioned that one is balanced by the other.

6. In an amplifying gage, a supporting frame, a work engaging device mounted on said frame at one end thereof, a lever pivotally mounted on said frame on an axis spaced unequal distances from its ends, the shorter end of said lever being arranged to be actuated by said work engaging device, a second lever pivotally mounted on said frame and having its axis spaced unequal distances from its ends and having its shorter end arranged beneath and in operative engagement with the longer end of said first-mentioned lever, whereby said levers are maintained in a substantially balanced relation, and an indicating device mounted on said frame and arranged to be actuated by the longer end of the last-mentioned lever.

7. In an amplifying gage, a supporting frame, a work engaging device carried by said frame, an indicating device carried by said frame, an amplifying device to transmit the movement of said work engaging device to said indicating device, and means for adjusting the normal relative positions of said indicating device and said amplifying device to cause the former to indicate zero when said work engaging device is in engagement with a given piece of work.

8. In an amplifying gage, a supporting frame, a work engaging device carried by said frame, an indicating device carried by said frame, an amplifying connection between said work engaging device and said indicating device, and means for adjusting said indicating device on said frame relatively to said amplifying connection.

9. In an amplifying gage, a supporting frame, a work engaging device carried by said frame, an indicating device, a support for said indicating device adjustably mounted on said frame, an amplifying device mounted on said frame independently of said indicating device to connect the latter with said work engaging device.

10. In an amplifying gage, a supporting frame, a work engaging device carried by said frame, an indicating device adjustably mounted on said frame, an amplifying device to connect said work engaging device with said indicating device and comprising a lever, and means for adjusting said indicating device with relation to said lever when the latter is in any given position.

11. In an amplifying gage, a supporting frame, an indicating device mounted on said frame, means to impart bodily movement to said indicating device relative to said frame, a work engaging device mounted on said frame, and an amplifying device supported by said frame to connect said work engaging device with said indicating device.

12. In an amplifying gage, a supporting frame having a guideway at one end thereof, an indicating device having a part movably mounted in said guideway, means to move said part of said indicating device to adjusted positions in said guideway, a work engaging device mounted on said frame, and an amplifying device supported by said frame to connect said work engaging device with said indicating device.

13. In an amplifying device, a supporting frame having a guideway at one end thereof, an indicating device having a part movably mounted in said guideway, means to adjust said part of said indicating device in said guideway, means to secure said part in its adjusted positions, a work engaging device mounted on said frame, and an amplifying device supported by said frame to connect said work engaging device with said indicating device.

14. In an amplifying gage, a supporting frame, having a guide-way at one end thereof, an indicating device having a shank mounted in said guide-way, means for adjusting said shank in said guide-way and for locking the same in its adjusted position, a work engaging device, and an amplifying device to connect said work engaging device with said indicating device.

15. In an amplifying gage, a supporting frame having a guide-way, an indicating device having a shank mounted in said guide-way and provided with a screw-threaded portion extending beyond the end of said guide-way, a nut mounted on said screw-threaded portion of said shank to adjust the latter with relation to said guide-way, means for locking said shank in its adjusted position within said guide-way, a work engaging device, and an amplifying device to connect said work engaging device with said indicating device.

16. In an amplifying gage, a supporting frame having a split sleeve at one end thereof forming a guide-way, an indicating device having a shank mounted in said split sleeve and provided with a screw-threaded portion extending beyond the end of said sleeve, a nut mounted on said screw-threaded portion of said shank and arranged to engage the end of said sleeve, a spring acting on said shank to hold said nut in engagement with said end of said sleeve, a clamping screw for tightening said sleeve about said shank, a work engaging device, and an amplifying connection between said work engaging device and said indicating device.

17. In an amplifying gage, a supporting frame having a guide-way at one end and a split sleeve at the opposite end, a work engaging member mounted in said guide-way, a shank mounted in said split sleeve and having a screw-threaded portion extending beyond the end thereof, an indicating device carried by said shank, a nut mounted on the screw-threaded end of said shank, a spring acting on said shank to hold the nut in engagement with the end of said sleeve, a clamping screw to tighten said sleeve about said shank, and a pair of amplifying levers operatively connected one with the other and connected at their respective outer ends with said work engaging pin and said indicating device.

18. In an amplifying gage, a supporting frame having a guide-way at one end and a split sleeve at the opposite end, a work engaging member mounted in said guide-way, a shank mounted in said split sleeve and having a screw-threaded portion extending beyond the end thereof, an indicating device carried by said shank, a nut mounted on the screw-threaded end of said shank, a spring acting on said shank to hold the nut in engagement with the end of said sleeve, a clamping screw to tighten said sleeve about said shank, and a pair of amplifying levers operatively connected one with the other and connected at their respective outer ends with said work engaging pin and said indicating device, said levers having their axes arranged nearest those ends which are remote from said indicating device and being arranged in a substantially balanced relation one with the other.

In testimony whereof, I affix my signature hereto.

FRANK L. WALTER.